UNITED STATES PATENT OFFICE.

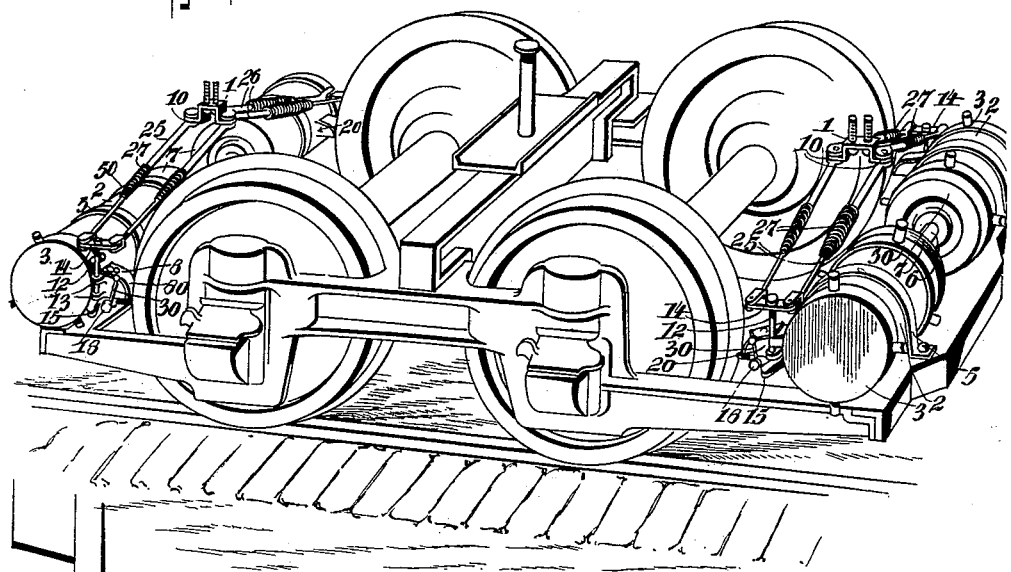
R. H. SCROGGINS.
WHEEL FLANGE LUBRICATOR.
APPLICATION FILED MAY 22, 1913.
1,104,321.
Patented July 21, 1914.
2 SHEETS—SHEET 1.

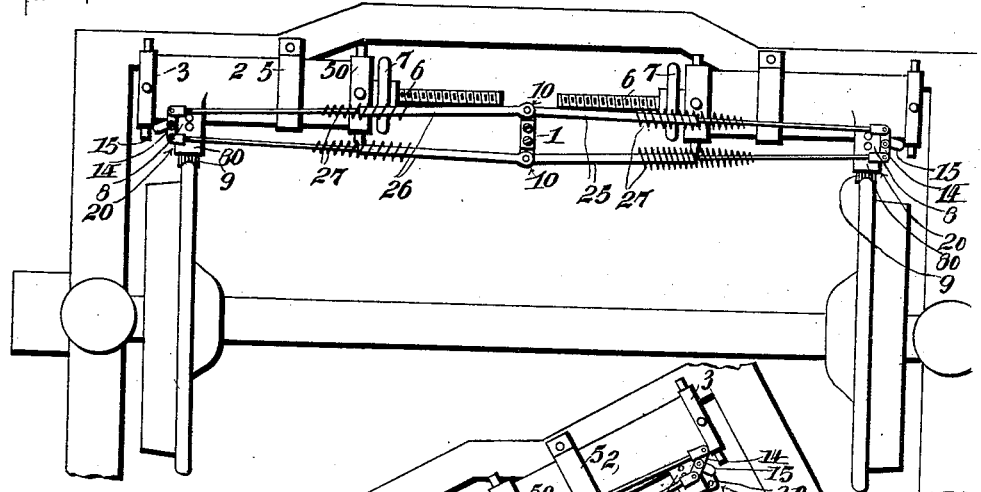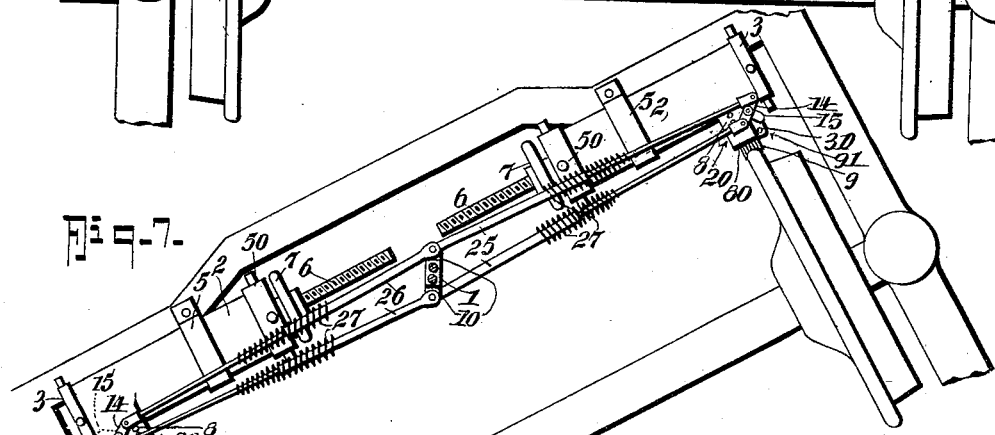

ROBERT H. SCROGGINS, OF VIENNA, VIRGINIA, ASSIGNOR OF ONE-HALF TO JOSEPH H. BRADLEY, OF WASHINGTON, DISTRICT OF COLUMBIA.

WHEEL-FLANGE LUBRICATOR.

1,104,321. Specification of Letters Patent. Patented July 21, 1914.

Application filed May 22, 1913. Serial No. 769,245.

*To all whom it may concern:*

Be it known that I, ROBERT H. SCROGGINS, residing at Vienna, in the county of Fairfax and State of Virginia, have invented a new and Improved Wheel-Flange Lubricator, of which the following is a specification.

My invention relates to means for lubricating wheel flanges and it more particularly has for its object to provide a new and improved means for lubricating car wheel flanges, particularly the wheels of street cars to thereby materially reduce the friction between the car wheel flanges and the curved track sections on which they run and also overcome the grinding noises incident in the ordinary running of the wheel flanges when rounding curves.

Another object of my invention is to provide a lubricating means of the general character mentioned in which the action of applying the lubricant and cutting off the feed thereof is entirely automatic and the said actions controlled by movement of the car truck as it passes onto and off the curved track sections.

A further object of my invention is to provide a wheel flange lubricator in which is included a simple and inexpensive arrangement of parts capable of being readily attached to any of the ordinary types of street car bodies and their coöperating running gear, and in which special provision is made for conveniently resupplying the lubricant and adjusting the parts for a positive, uniform, and economic supplying of the lubricant at the required times.

With other objects in view that will hereinafter appear, my invention consists in the peculiar construction and novel combination of the parts hereinafter described, specifically pointed out in the appended claims and illustrated in the accompanying drawings, in which:

Figure 1 is a perspective view of my invention, so much of a car truck being shown as is necessary to illustrate a practical application of my invention, the parts being shown at the normal or straightway running position. Fig. 2 is a longitudinal section of one of the lubricant or grease holding cylinders, and the feed plunger or piston. Fig. 3 is a detail horizontal section of the nozzle or discharging end of the lubricant cylinder, the closure member therefor, and the oscillatory crank device that coöperates with the said closure member and the spreading brush devices. Fig. 4 is a cross section thereof on the line 4—4 on Fig. 3, Fig. 5 is a detail perspective view of the slidable brush carrier. Fig. 6 is a plan view of the car truck with my lubricating means applied, the parts being at the normal position. Fig. 7 is a similar view, the truck being shown in the position of rounding a curve, and the lubricating means adjusted for lubricating the wheel flanges. Fig. 8 is a detail side elevation of the closure means for the lubricant discharging nozzle the lubricant receiving brush and the lever controlled devices for actuating the said closure means and the brush, the parts being at the normal position. Fig. 9 is a similar view of the parts shown in Fig. 8, the latter being shown adjusted for applying the lubricant to the wheel flange. Fig. 10 is a perspective view of the parts shown in Figs. 8 and 9, portions thereof being broken away and in section to better illustrate the coöperation of the same.

In my construction of lubricating mechanisms, the several parts are so combined and arranged that the feed of the lubricant is controlled by closure members that cut off the outflow of the lubricant from the lubricant holders and so arranged that they are automatically moved to their open or closed positions as the car passes onto and leaves the curve.

In carrying out my invention, I employ a bracket 1, at one or both ends of the car platform, and which is centrally positioned and extends in the longitudinal plane of the platform or car body to which the said bracket 1 is pendently and fixedly attached. The front and rear ends of the bracket 1 are bent down to form apertured ears 10, the purpose of which will presently appear.

2 designates lubricant holding cylinders mounted on the car truck in any suitable manner, one of such cylinders being disposed in advance of each of the car wheels, as is clearly shown in Fig. 1.

Each lubricant holding cylinder is in coöperative connection with a set of devices that control the outfeed of the said lubricant onto the adjacent car wheel flange and since the said set of devices for each car wheel and lubricant holding cylinder operate alike, a detailed description of one set of such devices will suffice for all of the several sets of devices.

Referring now more particularly to Fig. 2, it will be noticed the cylinder 2 is open at one end to thereby provide for quickly filling the cylinder with the heavy lubricant or grease commonly used for greasing the rails and the said end is held normally closed by a screw cap 3.

Adjacent the open end, and at the side facing the rear wheel flange, the cylinder 2 has a lateral discharging nozzle 20 which is normally closed by a gate or closure member 8, presently again referred to.

The grease within the cylinder is constantly forced toward the nozzle 20 by a plunger piston 4 that is normally forced in the direction of the arrow $x$ by a strong coiled spring 5 contained within the head end of the cylinder 2, the said head end including the removable screw cap 50 that has a central bore for the piston stem 6 which is threaded nearly its full length to receive the adjusting wheel nut 7, the latter being used for pulling the piston 4 back when it has passed to the foremost position and it is desired to refill the cylinder.

The outer end of the nozzle 20 is curved to accommodate the curved end of the closure member or gate 8 which member in the construction shown is a spring steel plate secured to the top of the nozzle 20 in such a manner that its front or gate portion 80 may be lifted sufficiently to expose a restricted outlet 21 in the nozzle (see Figs. 8 and 9).

I prefer to use a spring steel plate to serve as the closure member, since the free end can be easily buckled, as shown in Fig. 9 when lifting the said end and the spring of the plate aids in closing the said member over the lubricant outlet.

9 designates a brush or spreader device, which catches the lubricant as it flows from the nozzle 20 and directs it against the wheel flange (see Fig. 9) and the said brush comprises a holder 91 in which the wire bristles are secured, the latter being shaped to form a concave or gutter-like body, thereby snugly engaging the flange, the flexibility of the brushes affording a desired wiping action on the wheel flange (see Fig. 9).

The brush holder, shown in detail in Fig. 5, includes a head block 92 having a dovetailed flange 93 and a lateral wing 94 that carries a bearing roller 95 and has a longitudinal groove in its upper face, as shown.

22 designates a dovetailed guide that is longitudinally disposed and is secured to the bottom of the nozzle 20 and in which the flange 93 of the block 92 slides.

12 designates a perpendicular rock shaft mounted in the bearings 13—13 on the side of the nozzle 20, the upper end of which carries a cross head or arm 14 and the lower end of which carries a hollow crank shaped cam 15 that is disposed at right angles to the cross arm 14 and into which the roller bearing 95 of block 92 projects, the relation of the said parts, the cam 15, the rock shaft, and the slide block 92, being such, that as the shaft 12 is rocked the slide block 92 will be moved toward or from the wheel flange, it being obvious that in the practical arrangement of the parts, the slide block 92 is caused to slide out toward the wheel flange as the car wheels approach the curve and to slide back away from the wheels as they leave the curve.

17 designates a clip block that is adjustably mounted on the wing 94 of the slide block it being held to its set positions by the clamp screw 18 the clip having a flange and lip for engaging the edge of the wing 94 and the groove 96, therein. Clip block 17 includes bifurcated apertured ears 19 in which is pivoted one end of a thrust rod 30, the upper end of which is adjustably connected to a sleeve 31 on the closure gate 8, to which it is held by the binding screw 32.

By reason of the peculiar construction of the parts, as described and shown, when shaft 12 is rocked on approaching a curve, the cam device on the lower end thereof moves the slide block with the brushes out toward the wheel flange and simultaneously raises the gate 8 as in Fig. 9 and the spring plunger pressure on the lubricant causes the lubricant to flow out against the wheel flange, it being understood that as the wheel leaves the curve the shaft 12 is rocked in the opposite direction and thereby causes the parts to assume the position shown in Fig. 8.

Referring now more particularly to Figs. 6 and 7 it will be seen that provision is made for simultaneously operating the lubricating devices for both of the front wheels, and for such purpose a pair of lever rods 25—25 are pivotally secured to the front and back ears of the bracket 1 and pivotally secured to the opposite ends of the cross arms of the rock shaft 12 at one wheel and like rods 26—26 are likewise joined to the said bracket ears and the cross arm of the rock shaft for the other wheel, and such connection provides for working both rock shafts to provide for applying the lubricant to the two wheels.

To provide against undue strain on the rock shafts 12, that might occur under sudden shifting of the lever rods 25—26 and when passing swiftly around very sharp curves, the rods 25—26 are made of telescopic sections held to a normally fixed relation by the coiled springs 27 the tension of which is such to hold the rod sections as one under ordinary conditions, and to permit of their contraction under excessive strains.

From the foregoing description taken in connection with the drawings the complete construction, the operation and advantages of my invention will be readily apparent to those skilled in the art to which it appertains.

What I claim is:

1. A lubricating means of the character described, the combination with the car truck, a lubricant holder mounted thereon and having a discharging nozzle arranged to eject the lubricant against the car wheel flange, means coöperating with the holder for normally forcing the lubricant through the nozzle, a closure member for the nozzle and a means for catching the lubricant as it escapes from the nozzle to cause it to smear over the wheel flange against which the lubricant is ejected, and other means actuated by the swinging of the car truck for controlling the movements of the closure member and the means for smearing the ejected lubricant onto the wheel flange.

2. In a wheel flange lubricator, the combination with the wheeled truck; of a lubricant holding cylinder mounted on the truck, said cylinder having an ejecting nozzle for delivering the lubricant against the wheel flange, a spring-pressed piston within the cylinder that forces the lubricant toward the nozzle, means operable externally of the cylinder for returning the spring-pressed piston to its back position, the said cylinder having a capped filling end, a closure member for the nozzle end, and means controlled by the lateral swing of the car truck that coöperates with the closure member to effect the opening and closing of the said closure member.

3. In a wheel flange lubricator, the combination with the wheeled truck; of a lubricant holding cylinder mounted on the truck, said cylinder having an ejecting nozzle for delivering the lubricant against the wheel flange, a spring-pressed piston within the cylinder that forces the lubricant toward the nozzle, means operable externally of the cylinder for returning the spring-pressed piston to its back position, the said cylinder having a capped filling end, a closure member for the nozzle end, means controlled by the lateral swing of the car truck that coöperates with the closure member to effect the opening and closing of the said closure member, and means including a rock shaft, a cam thereon, a slidable member whose movements are controlled by the movements of the cam and a connection that joins the closure member and slidable member.

4. In a car wheel flange lubricator, the combination with the car truck, of a cylinder located in front of each one of an opposite pair of car wheels, each cylinder including a laterally projected nozzle for ejecting the lubricant over its corresponding wheel flange, means contained within each cylinder for normally forcing the lubricant therein through the nozzle thereof, a closure member for each cylinder nozzle, and a means controlled by the lateral swing of the car truck for simultaneously opening the closure members for the opposite cylinders.

5. In a car wheel flange lubricator, the combination with the car truck, of a cylinder located in front of each one of an opposite pair of car wheels, each cylinder including a laterally projected nozzle for ejecting the lubricant over its corresponding wheel flange, means contained within each cylinder for normally forcing the lubricant therein through the nozzle thereof, a closure member for each cylinder nozzle, a means controlled by the lateral swing of the car truck for simultaneously opening the closure members for the opposite cylinders, said means including a pair of oppositely disposed rock shafts, each carrying a cross head, a longitudinally disposed bracket secured to the car body and having pendent front and rear bearings, a pair of connecting lever members for each rock shaft pivotally connected to the opposite ends of the front and rear pendent brackets, and to their respective rock shaft cross heads.

6. In a car wheel flange lubricator, the combination with the car truck, of a cylinder located in front of each one of an opposite pair of car wheels, each cylinder including a laterally projected nozzle for ejecting the lubricant over its corresponding wheel flange, means contained within each cylinder for normally forcing the lubricant therein through the nozzle thereof, a closure member for each cylinder nozzle, a means controlled by the lateral swing of the car truck for simultaneously opening the closure members for the opposite cylinders, said means including a pair of oppositely disposed rock shafts each carrying a cross head, a longitudinally disposed bracket secured to the car body and having pendent front and rear bearings, a pair of connecting lever members for each rock shaft pivotally connected to the opposite ends of the front and rear pendent brackets, and to their respective rock shaft cross heads, said levers each consisting of two telescopic sections and a yieldable connection for holding the lever sections together, to act as a single member under ordinary pulling or pushing strains thereof.

ROBERT H. SCROGGINS.

Witnesses:
 FRED G. DIETERICH,
 ROBERT M. GREENWELL.

Copies of this patent may be obtained for five cents each, by addressing the "Commissioner of Patents, Washington, D. C."